June 25, 1968     B. Z. FRIEDLANDER     3,390,397

PSYCHOLOGICAL TESTING RECORDER

Filed Feb. 16, 1966     3 Sheets-Sheet 1

INVENTOR
BERNARD Z. FRIEDLANDER
BY
Watts & Fisher
ATTORNEYS

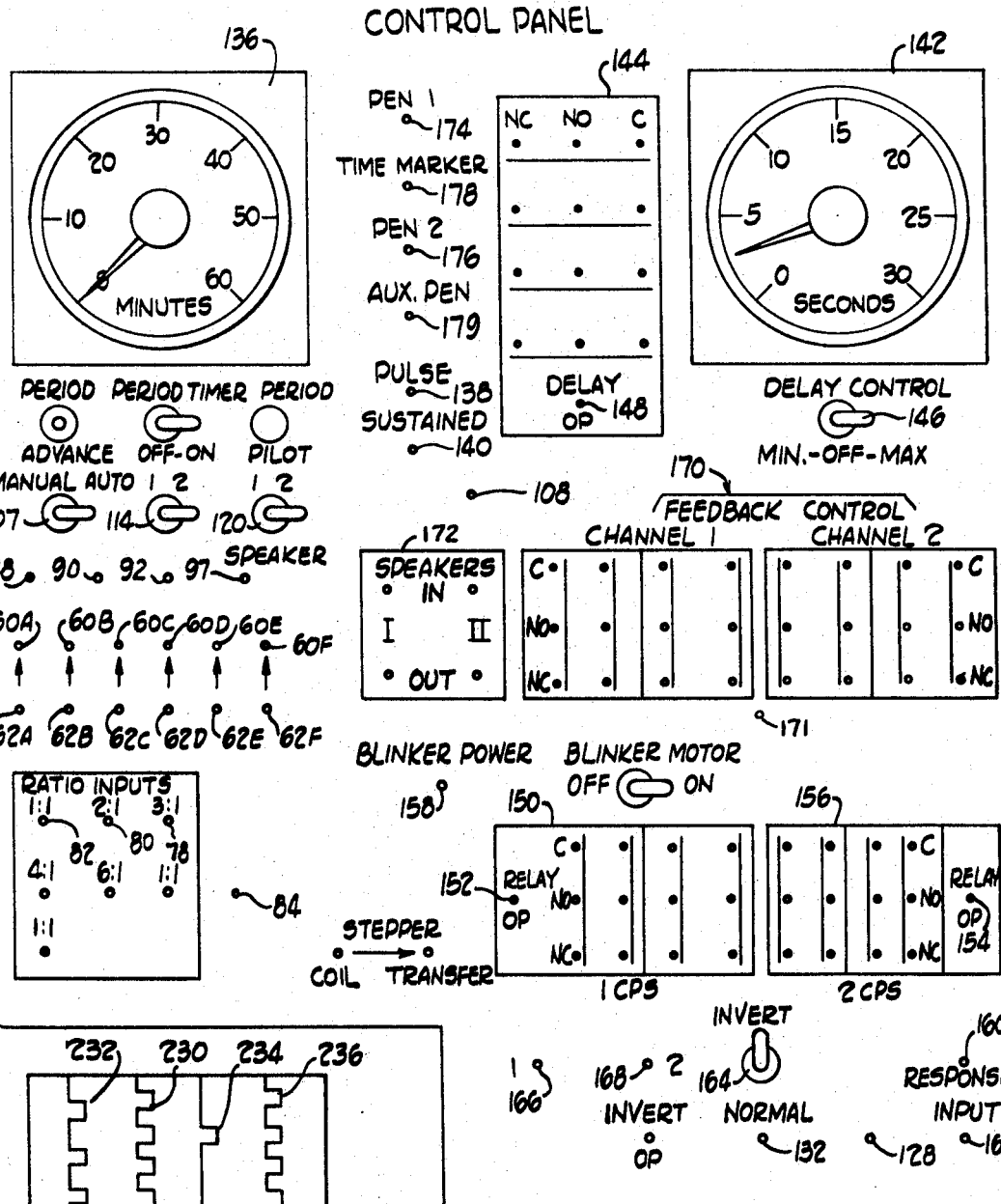
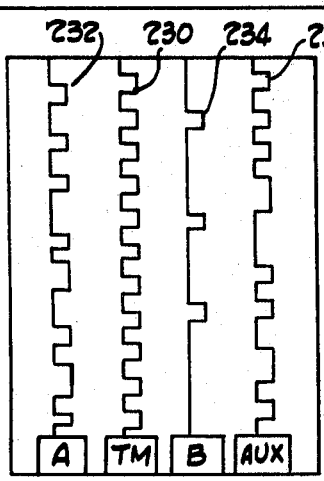
Fig. 3
Fig. 5
INVENTOR
BERNARD Z. FRIEDLANDER
BY
ATTORNEYS

United States Patent Office 3,390,397
Patented June 25, 1968

3,390,397
PSYCHOLOGICAL TESTING RECORDER
Bernard Z. Friedlander, 2231 Bellfield Ave.,
Cleveland Heights, Ohio 44106
Filed Feb. 16, 1966, Ser. No. 527,856
10 Claims. (Cl. 346—33)

ABSTRACT OF THE DISCLOSURE

A programmable control energizes stimuli-producing means such as lights in predetermined spatial and time patterns. Two manually operable actuators operate switches, which vary the patterns produced by the programmable control. Signals produced by movement of the actuators are recorded along with signals indicative of energization of the stimuli-producing means.

---

This invention relates to apparatus for testing infants and more particularly relates to testing apparatus that is useful in studying human infants operant performance for visual and auditory reinforcers in a normal environment.

An infant's ability to interact with this environment as an adaptive participant in the events that surround him is an important aspect of his psychological development. This aspect of psychological development may be examined in four principal categories: (1) the ability to recognize action sequences that are effective in producing observable changes in the infant's environment, (2) the learning of the causal relationship between his sequences of actions and the consequences of these actions in the form of stimulus feedback, (3) the development of preferences between different classes and levels of stimuli fed back to him as a result of his action, and (4) the recognition of the significance of stimuli that describe or predict the consequences of his action sequences.

In studying these aspects of the psychological development of an infant, it is desirable that the infant be in a normal environment and free from the influences of adult humans. It is also desirable that a preprogrammed sequence of visual and auditory stimuli be presented to the infant and that the infant be provided with a choice of responses to the stimuli. The responses should be automatically recorded in such a manner that the infant's tendency to select one action in response to the stimulus resulting from the action in preference to selecting a second action can be later studied. Also, it is frequently desirable to measure the infant's efficiency of performance. To do this, the frequency and duration of the infant's actions must be recorded and correlated with the duration of the stimulus presented to him.

Accordingly, it is an object of this invention to provide improved apparatus for testing an infant's ability to act upon and interact with his environment.

It is a further object of this invention to provide a psychological testing apparatus which may be preprogrammed to test an infant over a long period of time while the infant is in his natural environment and free from undue influence by adults.

It is a still further object of this invention to provide a psychological testing apparatus for infants in which the infant is offered a choice of two manipulators, each of which provides different stimuli in response to manipulation, so that the infant may make a choice between stimuli and manipulators.

It is a still further object of this invention to provide a psychological testing apparatus for infants in which the stimuli may be switched to eliminate position bias as a variable.

It is a still further object of this invention to provide a psychological testing apparatus for infants in which a permanent recording may be made of the frequency and duration of manipulations and in which a recording may be made showing the time relationship between the presentation of a stimuli and a manipulation by the infant.

It is a still further object to regulate the stimuli over many dimensions of value, such as sound-sight modality, position, time duration, and content in order to maintain experimental control over the infant's selection options.

In accordance with the above objects, a plurality of manipulatable devices is provided, each of which generates an electrical signal upon being handled. Also, a plurality of stimuli such as lights or noise-making devices are provided. The stimuli and the manipulators are automatically controlled from a programmable control panel so that a sequence of stimuli may be presented and so that the manipulatable devices can be made inactive or active at predetermined times. The outputs from the manipulatable devices and signals that indicate the presence of stimuli can be recorded.

The manipulators and the stimuli are adapted to be fastened to a crib so that they may be left with an infant for an extended period of time. The control panel can be programmed such that a predetermined sequence of stimuli are presented to the infant during this time. Also, the control panel can be programmed so that the stimuli presented to the infant are changed when the infant handles the manipulators. The frequency and time duration of the handling of the manipulators can be recorded. A recording can also be made which shows the length of time that it takes an infant to react to the removal of a stimulus.

The invention and the above and other objects thereof will be understood more clearly and fully from the following detailed description when considered in connection with the accompanying drawings in which:

FIGURE 3 is a simplified representation of the control panel used in an embodiment of the invention;

FIGURE 5 is a simplified representation of typical recorded information obtained by an embodiment of the invention.

Figure 1:
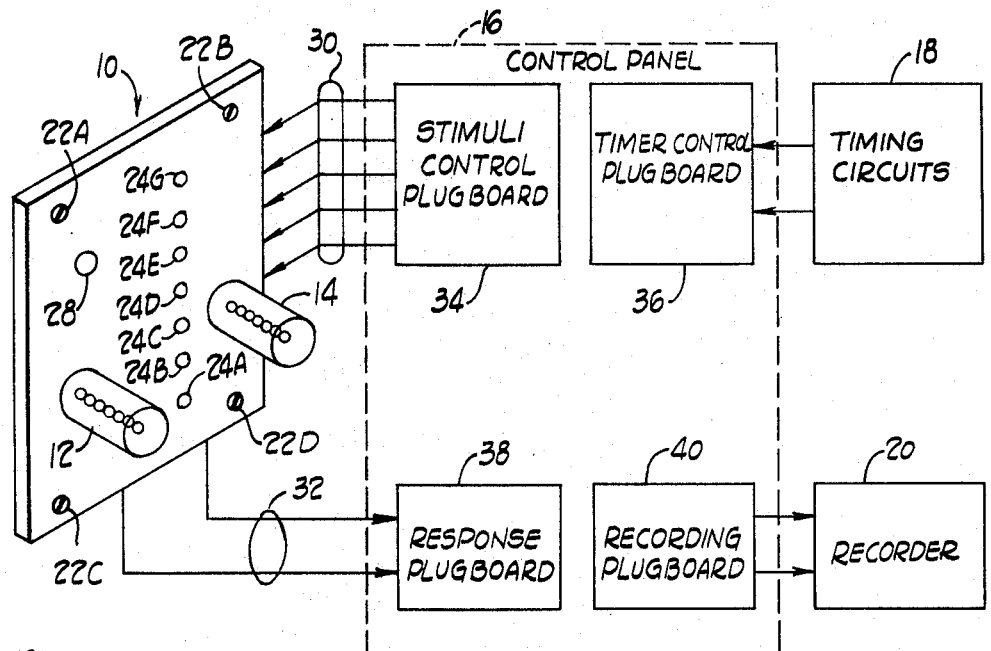
FIGURE 1 is a block diagram illustrating the general arrangement of an embodiment of the invention.

In FIGURE 1, the general arrangement of the invention is shown having a panel 10 containing manipulators 12 and 14, a control panel 16, timing circuitry 18, and a recorder 20. The panel 10 may be fastened to a crib by means of the bolts 22A–22D. A plurality of lights 24A–24G are also mounted on the panel. The manipulators 12 and 14 also have seven lights mounted directly on them. Furthermore, sound-making apparatus such as the speaker 28 is mounted on the panel.

The control panel 16 provides signals to the panel 10 through a plurality of conductors 30. These signals control the stimuli such as the lamps 24A–24G or the speaker 28. Also signals are provided to the control panel 16 through a plurality of conductors 32 from the panel 10 in response to the handling of the manipulators 12 and 14. The control panel 16 may be thought of as being made up of four separate programmable sections: the stimuli control plug board 34, the timer control plug board 36, the response plug board 38, and the recording plug board 40. Electrical connections between these plug boards and between different points on the same plug board may be made on the face of the control panel or may be made by a pre-wired connector unit that is insertable in separate sockets to make the appropriate electrical connections.

The response plug board 38 receives the signals from the manipulators 12 and 14 over the lines 32 and makes them available at output terminals on the response plug board 38. These signals may be made available at the output of the response plug board in two different forms: a negative 24 volt output while a manipulator is being handled from output terminals that normally are at ground potential or a ground level output signal while a manipulator is being handled from output terminals that normally contain a static negative 24 volts.

The stimuli control plug board 34 contains a plurality of connectors which may be used to select the individual stimuli on the panel 10 and to actuate the selected lamps or sound sources. Through the plug board 34 a sequence of displays or sounds may be programmed on the panel 10 under the control of signals from the timer control plug board 36 or the response plug board 38 or a combination of these two.

The timer control plug board 36 provides a series of pulses at some of its output terminals. It also has internal connections which will interrupt signals passed through the unit. For example, a long signal from the response plug board 38 may be passed through the timer control panel 36 to cause it to appear at an output terminal as a series of blinking signals that last as long as the signal is present on the response plug board 38. These signals in turn can be applied to the stimuli control plug board 34 to actuate lamps or sound sources on the panel 10. The timer control plug board 36 also has internal connections which enable it to provide an output signal of a predetermined length in response to a short intermittent signal or an output signal that terminates a predetermined time after receiving a continuous input signal. These output connections are controlled by the timing circuit 18.

The recording plug board 40 may receive signals from any of the other plug boards and apply them to the recorder 20. The recorder 20 includes counters for recording the number of times each of the manipulators 12, 14 are handled and elapsed time meters which may be used to record the duration for which either manipulator is handled. It also includes a four channel oscillograph which may display the duration that both of the manipulators are handled and show their relation to stimuli signals applied from the plug board 34 and to periodic time signals that may be received internal to the recorder 20 or from the timer control plug board 36.

The testing apparatus shown in block diagram form in FIGURE 1 provides great flexibility in the type of tests that may be given to an infant. The test apparatus may be programmed so as to operate for long periods of time without intervention by a controller. Because of this, an infant may be left alone with the panel 10 for long periods of time to provide tests in a natural test environment. Under the control of the program, a predetermined sequence of stimuli may be presented to the infant and his handling of the manipulators 12 and 14 in response to this stimuli may be recorded.

It can be determined if he handles the particular manipulator because of its location or in response to a cue light located on it by automatically changing the location of the illumination. The ability of the infant to learn the causal relationship between his action and his consequences can be tested by automatically varying the stimuli presented to him in response to his handling of the manipulators. Also, recordings can be made showing the time relationship between his handling of a manipulator and the presentation of the stimuli. This provides an indication of the efficiency of his performance since it shows the period of time that elapsed between the extinguishing of the stimuli and the infant's release of the manipulator.

Figure 2:
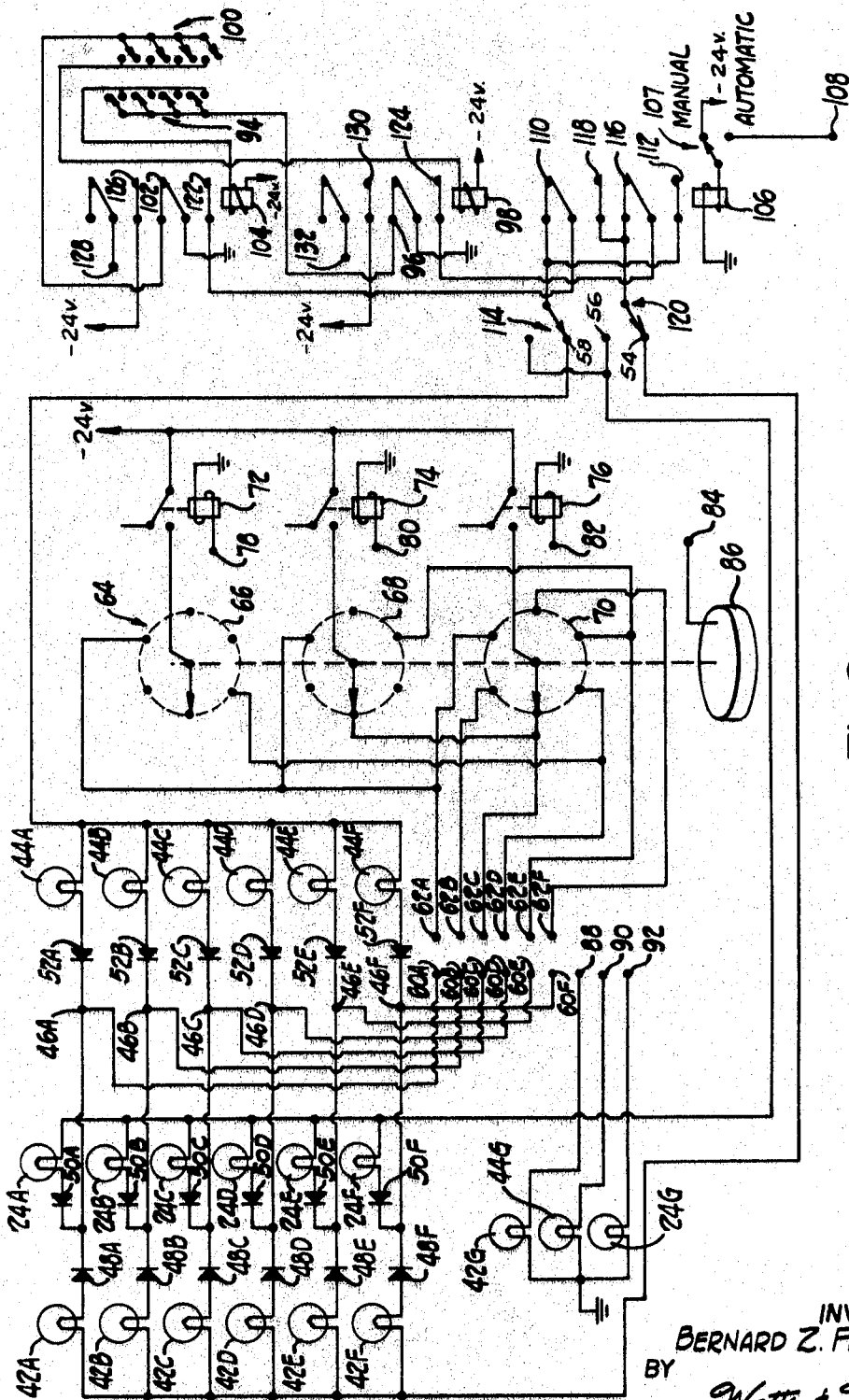
FIGURE 2 is a schematic circuit diagram illustrating the manner in which stimuli are controlled and signals representing the infant's responses are obtained in an embodiment of the invention.

In FIGURE 2 a schematic circuit diagram is shown illustrating the wiring of the lamps and the switches for the manipulators 12 and 14 on the panel 10. The seven lamps 42A–42G are mounted along the manipulator 12 with the lamp 42G located farthest from the panel 10. The lamps 44A–44G are mounted along the center of the translucent manipulator 14 with the lamp 44G being farthest from the panel 10. These lamps may have different colors. The lamps 24A–24G are mounted along the center of the panel 10 between the two manipulators 12 and 14.

Each of the filaments of the lamps 42A–42F has one end electrically connected to a different one of the terminals 46A–46F through the forward resistance of a corresponding one of the diodes 48A–48F. Similarly, each of the filaments of the lamps 24A–24F and 44A–44F has one end electrically connected to a corresponding one of the terminals 46A–46F through the forward resistance of a corresponding one of the diodes 50A–50F and 52A–52F respectively. The other end of the filaments of each of the lamps 42A–42F are electrically connected to a switch contact 54; the other ends of the filaments of each of the lamps 24A–24F are each electrically connected to a switch contact 56; the other ends of the filaments of each of the lamps 44A–44F are electrically connected to a switch contact 58. The terminals 46A–46F are each electrically connected to a different one of the terminals 60A–60F which appear as sockets on the stimuli control plug board 34.

Six other sockets appear adjacent to the sockets 60A–60F on the stimuli control plug board. These terminals are 62A–62F and are intended to be selectively connected to the terminals 60A–60F when the testing apparatus is programmed. The output lugs from a stepping switch 64 having a plurality of wafers, three of which 66, 68 and 70 are shown, are selectively electrically connected to the terminals 62A–62F.

The center contacts of the wafers 66, 68 and 70, are each connected to a normally open contact of a different one of the three relays 72, 74, and 76 respectively. The armature (movable contact) of each of the relays 72, 74, and 76 is electrically connected to a source of a negative 24 volts. The actuating windings of the relays 72, 74, and 76 have one end grounded and the other end electrically connected to a different one of the terminals 78, 80, and 82 which terminals appear as sockets on the stimuli control plug board 34. Another terminal 84, which also appears on the stimuli control plug board as a socket, is electrically connected to the stepping motor 86 of the stepping relay 64. Each of the six successive output lugs on the wafer 70 is electrically connected to a different one of terminals 62A–62F; every other one of the output lugs of the wafer 68 is electrically connected to a different one of the alternate output terminals 62A–62F; every third output lug on the wafer 66 is electrically connected to a different one of the terminals 62A–62F which are spaced three terminals apart on the stimuli control plug board.

It can be seen that each time an impulse is applied to a terminal 84, the stepping motor 86 moves one position. At the same time, if a pulse is applied to terminal 82 a negative 24 volts is connected to the contact switch of the wafer 70. This causes a negative 24 volts to appear on one of the terminals 62A–62F. If the two pulses are repeated, this negative 24 volts is moved from position to position in sequence along the line of terminals 62A–62F. On the other hand, if input pulses are applied simultaneously to terminal 84 and terminal 80, a negative 24 volts is applied to alternate ones of the terminals 62A–62F. In a similar manner, other wafers of the stepping switch 64 can be wired to provide a different pattern of output pulses at the terminals 62A–62F.

By connecting these terminals 62A–62F to selected ones of the terminals 60A–60F a negative 24 volts can be applied to one end of the filaments of any three of the lamps 42A–42F, 24A–24F, and 44A–44F. The particular one of the lamps from the three lamps in any group that has a negative pulse applied to it is selected by grounding one of the contacts 54, 56, or 58. The diodes in series with the filaments of each of the lamps provides isolation to prevent the other two lamps in the same group as the selected one from being illuminated.

The remaining three lamps 24G, 42G, 44G, shown in FIGURE 2, are called cue lamps. The lamps 42G and 44G are located at the tips of the manipulators 12 and 14. One end of the filament of each of these lamps is grounded; the other ends are each connected to a different one of the terminals 88, 90, and 92. These terminals also appear at the output sockets on the stimuli control plug board 34.

A group of four microswitches 94 are mounted at the base of the manipulator 14 and each have one of their normally open contacts electrically connected in parallel to a contact 96 of a four pole, double throw relay 98. Another group of four microswitches 100 each have one of their normally open contacts connected in parallel to a normally closed contact 102 of the four pole, double throw relay 104, and are each mounted on the base of the manipulator 12. The other contacts of each of the four microswitches in group 100 are electrically connected in parallel to one end of the actuating winding of the relay 98 and the other contacts of the microswitches in group 94 are each electrically connected in parallel to one end of the actuating winding of the relay 104. The other ends of the actuating windings of the relays 98 and 104 are electrically connected to a source of a negative 24 volts.

Accordingly, whenever either of the manipulators 12 or 14 is moved, a contact in one of the groups of microswitches 94 or 100 is closed causing a corresponding winding of the relays 104 or 98 to be energized. Only one of the two relays 104 or 98 can be energized at one time. This is because whenever the microswitches in one of the manipulators causes one of the relays to be actuated by grounding one end of its energizing coil it also creates an opening in the energizing winding of the other relay so that it cannot be energized even though a microswitch in its corresponding group is closed. For example, if a microswitch in the group 94 associated with the manipulator 14 is closed, the energizing winding of relay 104 is grounded through the contact 96 of the relay 98. This causes the normally closed contact 102 of the relay 104 to open, breaking the ground connection in series with the contacts of the microswitch group 100 associated with the manipulator 12. Now even though one of the microswitches in group 100 associated with the manipulator 12 is closed, the energizing winding on relay 98 remains open and the relay is not energized.

Another relay 106 has one end of its energizing winding grounded and the other end connected to the contact of the two position switch 107. The two position switch 107 is a toggle switch mounted on the control panel. When it is in one position, the energizing winding of the relay 106 is connected to a source of negative 24 volts so as to hold it permanently closed. When the contact is in its other position, one end of the energizing winding of the relay 106 is connected to terminal 108 which is mounted as a socket on the stimuli control plug board. Output pulses provided at other sockets in the control panel may be connected into terminal 108 so as to energize the relay 106.

Normally closed contact 110 and normally open contact 112 of the relay 106 are both electrically connected to a contact arm of the two position toggle switch 114. Normally closed contact 116 and normally open contact 118 are both electrically connected to the contact arm of the toggle switch 120. Both of these toggle switches are mounted on the control panel.

When the toggle switch 114 is in one position, its contact arm is electrically connected to the contact 56 which in turn is electrically connected to one side of the filament of the lamps 24A–24F mounted on the panel 10. When it is in its other position, it is electrically connected to the contact 58 which in turn is electrically connected to one end of the filaments of all of the lamps 44A–44F that are mounted on manipulator 16. Similarly, when the contact arm of toggle switch 120 is in its first position, the contact arm is electrically connected to the contact 56 which in turn is electrically connected to one end of the filaments of the lamps 24A–24F mounted on the panel 10. When the contact arm of the toggle switch 120 is in its second position as shown, it is electrically connected to the contact 54 which in turn is electrically connected to one end of the filament of the lamps 42A–42F that are mounted along the center of the manipulator 12. One contact arm of the relay 106 is electrically connected to the normally open contact 122 of the relay 104 and the other contact arm of the relay 106 is electrically connected to normally open contact 124 of the relay 98.

It can be seen that the relay 106 together with the toggle switches 114 and 120 function as an inverter. That is, when the microswitches in group 100 are closed due to a manipulation of the manipulator 12, the conditions of the relay 106 and the toggle switches 114 and 120 determine whether the filaments in the group of lamps 42A–42F, 24A–24F, or 44A–44F will be grounded so that the individual lamps in the selected group may be illuminated by a positive pulse on its other side of its filament.

If the relay 106 is not energized, the movable contact of the switch 120 may be grounded through the relay contact 124, and the movable contact of the switch 114 may be grounded through the relay contact 122. If the relay 106 is energized, the condition is reversed; that is, the arm of the switch 120 may be grounded through the contact 122, and the arm of the switch 114 may be grounded through the contact 124. If either of these switches 114, 120 is in its first position, one end of the filament of the lamps 24A–24F may be grounded. If it is in its other position, one end of the filaments of the lamps 42A–42F may be grounded when the relay is not energized and one end of the filaments of the lamps 44A–44F may be grounded if the relay 106 is energized.

With this mechanization, the toggle switch 107 may be used to cause a light to be illuminated on the opposite manipulator that is touched or on the center panel of lamps. If the toggle switch 107 is in its other position, this inversion may be selected to occur at different times in connection with pulses applied to the terminal 108 from the timer control plug board 36.

The normally open contact 126 of the relay 104 is electrically connected to a source of negative 24 volts. Its associated armature is electrically connected to terminal 128 which forms an output socket on the response plug board 38. Accordingly, when the relay 104 is energized by the closing of a microswitch in the group 94 that is mounted on the manipulator 14, terminal 128 is electrically connected to the source of negative 24 volts from contact 126.

Similarly, the normally open contact 130 of relay 98 is electrically connected to a source of negative 24 volts. Its associated armature is electrically connected to output terminal 132 which is mounted as a socket in the response plug board 38. Therefore when one of the microswitches in group 100 mounted on the manipulator 12 is closed, a negative 24 volts appears on terminal 132. These outputs are utilized to actuate the recorder 20, to start a time period by connection with the timer control plug board 36, and to control various stimuli by connection through the stimuli control plug board 34.

In FIGURE 3, a diagram of a control panel is shown. The units on this panel are not positioned in the same manner as that shown in FIGURE 1, but are placed for better functional use whereas the positions in FIGURE 1 were determined for explanation purposes. This control panel includes a recycling time delay relay 136 which functions as the period timer for use in the timer control plug board. This time delay relay provides pulses at a frequency of between 1 to 60 cycles per minute. A suitable type of commercial unit is the Cramer relay 450D, manufactured and sold by Cramer Division of Giannini Controls Corporation. This period clock actuates a four pole, double throw relay to provide instantaneous negative 24 volt pulses at socket 138 which is normally grounded and to provide instantaneous ground level voltages at terminal 140 which is normally at a negative 24 volts.

A second time delay relay 142 is also mounted on the panel and serves as a delay clock. This time delay relay includes a latching relay. Four sets of output terminals are shown in the box 144 which include four socket terminals electrically connected to the normally closed contact of the delay relay and indicated by the initials NC above the vertical column of sockets, four socket terminals connected to the normally open contact indicated by the initials NO, and four sockets for connection to the armature of the delay relay indicated by the initial C. A suitable time delay relay is model No. C2163–E1–30 manufactured by the Electro-Seal Corporation.

When the toggle switch 146 is in its left hand position, the Electro-Seal timer connects the coil of a latching relay to ground when it is not operating. This latching relay provides a negative 24 volt output on the normally open terminals when it is closed and a ground potential on the normally closed contacts when it is open. An input pulse at this time to terminal 148 starts the Electro-Seal timer and causes the relay to latch. When the time set on the Electro-Seal timer has run its course, the latching relay is released and the signal output from the terminals 144 are ended. When the toggle switch 146 is in its right hand position or maximum position, the latching contact of the latching relay is opened by the Electro-Seal timer when it is running. When the Electro-Seal timer is not running, the energizing winding of the latching relay is open. Accordingly, the latching relay does not latch when an instantaneous input is applied to the terminal 148. Outputs are only obtained from the contacts 144 while an input is present of the terminal 148. When the Electro-Seal timer has run through its time, the energizing winding of the latching relay is opened so that the outputs are terminated even though there may still be an input on terminal 148.

In section 150 of the control panel, a plurality of output terminals are shown. These socket output terminals are connected to the terminals of cam timers so that a negative 24 volt output appears at the terminals marked NO and a ground level output at the others whenever an input is applied to terminal 152 or 154. Section 150 is operated by a one cycle per second cam timer and section 156 is operated by a two cycle per second cam timer. Appropriate cam timers may be purchased from Industrial Timer Corporation. The input power for the cam timers may be applied through the socket 158.

The input signals from the manipulators first enter the panel at sockets 132 and 128. These pulses also appear at terminals 160 and 162 which are convenient points to be connected to the recording section because of a direct connection to terminals 132 and 128. The toggle switch 164 controls a four pole double throw switch for inverting the signals at terminals 162 and 160 and connecting these inverted signals to the sockets 166 and 168. That is, when the toggle switch is down, terminal 132 is connected to terminal 166 and, when the toggle switch is up, terminal 132 is connected to terminal 168. The connections between terminal 128 and the terminals 166 and 168 are just opposite those of 132.

The same signals that are connected to terminals 166 and 168 are also connected to the armature contacts of relays the output of which appears in the sockets labeled C in section 170 with the outputs that are the same as appear at terminal 166 appearing in the left hand group and the outputs that are the same as those appearing at terminal 168 appearing in the right hand group. These relays are also operated by signals applied to terminal 171 which energize the relays to switch the outputs from the normally closed contacts to the normally open contacts. They serve to provide inverted outputs as well as normal outputs at the normally closed terminals and normally open terminals respectively.

A section 172 is provided on the panel for connectors to speaker mounted on the panel 10. The terminal 174 is connected to a relay for controlling the first pen of the oscillograph and the terminal 176 is connected to a relay for controlling the second pen of the oscillograph. Terminal 178 is connected to a relay for controlling a third pen and is normally used to receive clock pulses so as to form a time standard on the recording made by the oscillograph. The outputs from the terminals 166 and 168 are also applied to individual frequency counters. A selected output may also be applied to a time duration counter which operates from internal clock pulses in the recorder unit as long as there is a signal on a selected one of the terminals 166 and 168. A signal applied to the speaker socket 177 closes a relay switch to connect the speaker input plugs to the speaker output plugs. The speaker input plugs may be connected to the output of a tape recorder.

It is clear that a count will be obtained of the number of times a child manipulates the manipulator 12 and 14 from the outputs at the terminals 166 and 168. The outputs from these terminals or the inverted outputs as obtained by switching toggle 164 to the inverted position may be applied to the stepper input motor terminal 84. Light may be selected to be turned on at any location by making the appropriate connections between the terminals 60A–60F and 62A–62F. These lights may be controlled so as to be illuminated only once in a certain number of responses by connecting the output terminals 82, 80 or 78 to selected ones of the terminals 62A–62F. Also various display patterns may be programmed to occur without human intervention by connecting the outputs from the pulse clock 136 to the stepper switch 84 or to the light throughputs terminals 60A–60F. Instantaneous pulses may be obtained from terminal 138 or sustained pulses from terminal 140. Fixed duration pulses may be also obtained or limited duration pulses through the use of the delay clock 142. This panel provides the means for testing an infant according to a number of criteria across a long period of time.

Figure 4:
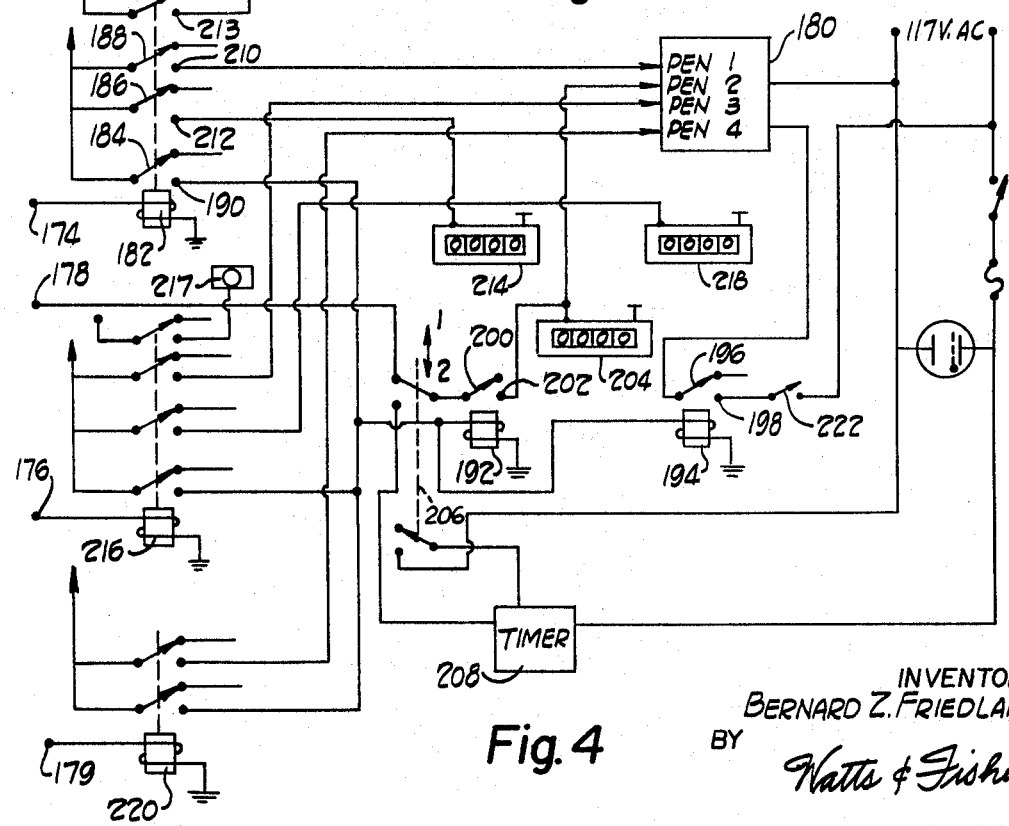
FIGURE 4 is a schematic diagram partially in block diagram form illustrating the circuitry used to control the recorder used in an embodiment of the invention.

In FIGURE 4, a simplified schematic diagram of the recorder panel is shown having an oscillograph 180 which may be the miniaturized four channel pen recorder manufactured by Rustrak Corporation, which is a subsidiary of Gulton Industries, Inc. and designated as model 92. Input pulses from terminal 174 energize the relay winding of the relay 182. The movable contacts 184, 186 and 188 of the relay 182 are all electrically connected to a source of DC voltage and the movable contact 189 is connected to an AC source of voltage at terminal 191. These contacts are normally open so that when the relay 182 is energized by its pulse on terminal 174, a voltage is applied to contact 190 of relay 182, energizing relay 192 and relay 194.

When relay 194 is energized, the contact 196 is closed to the contact 198 to complete the circuit from a source of DC power to the recorder motor 180 so that the chart on the oscillograph 180 begins to move. When the relay 192 is closed, the contact 200 is closed to the contact 202 to apply timing pulses to the elapsed time meter 204 and to channel two of the oscillograph 180. Whenever the double pole, single throw switch 206 is in position 1, these timing pulses are provided by terminal 178 and whenever the switch 206 is in its second position, the pulses are provided by the cam timer 208. When the relay 182 is energized, the movable contacts 188, 186 and 189 are also closed to contacts 210, 212, and 213 respectively so as to apply an input pulse to channel one of the oscillograph 180 and to the counter 214. An AC voltage is also applied to the elapsed time meter 215.

Similarly, whenever an input pulse is applied to terminal 176 relay 216 is energized to provide an input pulse to pen three of the oscillograph 180, an input pulse to the counter 218, to close relay 192 and 194 providing timing pulses to the elapsed timing counter 204, and to apply an AC voltage to elapsed time meter 217. Whenever an input is applied to the terminal 179, the relay 220 is energized so as to close relays 192 and 194 to provide timing signals to the oscillograph 180 and also to provide an input pulse to channel four of the oscillograph 180. Of course, the recording panel may be operated without using the oscillograph by opening switch 222.

In FIGURE 5 a graph is shown illustrating the type of recording that may be obtained from the oscillograph during a test. Channel 2 is shown by the series of recorded clock pulses 230 which form a time base by which to measure recorded responses of the infant and the stimuli provided to him. The curve 232 illustrates the type of responses which are made by handling the manipulator 12. It can be seen that both the occurrence and the duration of the handling of the manipulator can be shown. The number of times it is handled, of course, is counted by the counter 214 shown in FIGURE 4. If it is desired, the duration of the signal can be limited to the setting on the delay clock 142 whenever the switch is set in its right hand position as previously explained.

The curve 234 in a similar manner shows the responses made to the handling of the manipulator 14. Both of these responses can be compared to another signal such as that derived by the activation of stimulus on the panel 10. The time of this display is shown in the curve 236. By comparing these curves, information can be obtained that indicates which one of the two manipulators 12 and 14 is handled in response to a particular stimulus. For example, it is of interest to know whether the manipulator 12 is handled when a light is displayed on 12 or whether the manipulator 14 is handled in such a case. Similarly, the time that a stimulus is present before the child reacts by handling a manipulator can be determined from the chart as can the time that elapses after the stimulus terminates before the child releases the manipulator. Responses to different patterns of stimuli can also be observed. For example, comparisons can be made of a blinking light as compared to a constant light.

It can be seen that this test apparatus can be programmed and left with an infant for extended periods of time without adult intervention. In this manner, the child can be tested in his natural environment. Because of the flexibility of programming available with the tester through a simple plug board, a great many different kinds of studies can be obtained. It is especially significant that the test instrument can record both the stimulus provided to the child and his response to it. Also, the stimuli presented to the child can be varied in accordance with his reactions to it as well as being displayed in a fixed pattern.

Of course, many modifications and variations in the invention are possible in light of the above teachings. It is therefore to be understood that the invention may be practiced otherwise than that specifically described.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:
1. Apparatus for testing operant behavior in response to selected stimuli comprising:

(a) first and second switch means respectively having first and second manually-operable actuators for respectively providing first and second electrical signals in response to operation of said actuators;
 (b) a plurality of stimuli-producing means;
 (c) programmable control means for selectively energizing said stimuli-producing means in predetermined spatial and time patterns, and for providing third electrical signals indicative of such energizing;
 (d) electrical circuit means for providing said first and second electrical signals to said programmable control means for varying said patterns in response to said first and second electrical signals; and
 (e) recording means for receiving and recording said first, second and third electrical signals.

2. Apparatus in accordance with claim 1, further including clock means for providing clock pulses to actuate said programmable control means, and circuit means for providing said clock pulses to said recording means for recording.

3. Apparatus in accordance with claim 1, wherein said stimuli-producing means include three sets of lamps, two of said sets being respectively carried by said first and second actuators.

4. Apparatus in accordance with claim 1, wherein said programmable control means includes timing means for repetitively energizing said stimuli-producing means in said patterns.

5. Apparatus in accordance with claim 1, wherein said first and second electrical signals vary said patterns in two different, predetermined and interchangeable manners.

6. Apparatus in accordance with claim 3, wherein said first and second electrical signals vary said patterns in two different, predetermined and interchangeable manners.

7. Apparatus in accordance with claim 3, wherein said programmable control means includes timing means for repetitively energizing said stimuli-producing means in said patterns.

8. Apparatus in accordance with claim 7, wherein said first and second electrical signals vary said patterns in two different, predetermined and interchangeable manners.

9. Apparatus in accordance with claim 1, further including first and second counters respectively connected to be actuated by said first and second switch means for respectively counting occurrences of said first and second electrical signals.

10. Apparatus in accordance with claim 8, further including first and second counters respectively connected to be actuated by said first and second switch means for respectively counting occurrences of said first and second electrical signals.

References Cited

UNITED STATES PATENTS

| | | | |
|---|---|---|---|
| 1,564,138 | 12/1925 | Rowland | 35—11 |
| 2,678,692 | 5/1954 | Ranseen | 35—22 |

RICHARD B. WILKINSON, *Primary Examiner.*

J. W. HARTARY, *Assistant Examiner.*